(12) United States Patent
Shoup et al.

(10) Patent No.: US 12,305,929 B2
(45) Date of Patent: May 20, 2025

(54) ADVANCED MANUFACTURING HEAT PIPE SEGMENT WITH INTEGRAL PRINTED WICK

(71) Applicant: Westinghouse Electric Company LLC, Cranberry Township, PA (US)

(72) Inventors: Jeffrey Shoup, Delmont, PA (US); Clinton B. Armstrong, Slippery Rock, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 271 days.

(21) Appl. No.: 18/164,911

(22) Filed: Feb. 6, 2023

(65) Prior Publication Data
US 2024/0263888 A1 Aug. 8, 2024

(51) Int. Cl.
F28D 15/04 (2006.01)
B33Y 80/00 (2015.01)
F28D 21/00 (2006.01)

(52) U.S. Cl.
CPC ............ *F28D 15/046* (2013.01); *B33Y 80/00* (2014.12); *F28D 2021/0054* (2013.01)

(58) Field of Classification Search
CPC ........... F28D 15/046; F28D 2021/0054; B33Y 80/00
USPC .......................................... 165/80.4, 104.26
See application file for complete search history.

(56) References Cited

U.S. PATENT DOCUMENTS

| | | | | |
|---|---|---|---|---|
| 3,414,475 A | * | 12/1968 | Fiebelmann | G21C 15/02 976/DIG. 188 |
| 3,576,210 A | * | 4/1971 | Trent | F28D 15/046 29/890.032 |
| 3,681,843 A | * | 8/1972 | Arcella | B21C 37/151 29/890.032 |
| 4,441,548 A | * | 4/1984 | Franklin | F28D 15/046 165/104.27 |
| 6,450,132 B1 | * | 9/2002 | Yao | F28D 15/043 122/366 |

(Continued)

FOREIGN PATENT DOCUMENTS

| | | |
|---|---|---|
| DE | 102015115032 A1 | 3/2017 |
| JP | 2015166667 A | 9/2015 |

OTHER PUBLICATIONS

International Search and Written Opinion for corresponding International Application No. PCT/US2024/014439 mailed May 28, 2024.

(Continued)

*Primary Examiner* — Claire E Rojohn, III
(74) *Attorney, Agent, or Firm* — K&L Gates LLP

(57) ABSTRACT

A transition piece for joining heat pipe segments in a joining process is provided. The transition piece comprises a head section, a body section, a tail section and alignment tabs configured to facilitate a rotational alignment of an end of the body section and an end of a heat pipe segment during the joining process. The body section comprises a wick and an outer wall. Each of the alignment tabs comprises an end portion axially extending away from the body section. The body section and the alignment tabs are configured as an integral structure. A method for producing a transition piece of a heat pipe and a method for joining segments of a heat pipe are also provided.

20 Claims, 8 Drawing Sheets

(56) References Cited

U.S. PATENT DOCUMENTS

| | | | | |
|---|---|---|---|---|
| 6,768,781 | B1* | 7/2004 | Moriarty | G21C 15/257 |
| | | | | 376/907 |
| 7,445,039 | B2* | 11/2008 | Hou | F28D 15/025 |
| | | | | 165/104.21 |
| 7,891,413 | B2* | 2/2011 | Liu | F28D 15/046 |
| | | | | 29/890.032 |
| 12,173,967 | B2* | 12/2024 | Mohaupt | F28D 15/04 |
| 2009/0020268 | A1* | 1/2009 | Chang | F28D 15/046 |
| | | | | 165/104.33 |
| 2009/0020269 | A1* | 1/2009 | Chang | F28D 15/046 |
| | | | | 165/104.26 |
| 2009/0166004 | A1* | 7/2009 | Lai | F28D 15/046 |
| | | | | 165/104.26 |
| 2012/0102902 | A1* | 5/2012 | Gallagher | B01D 46/60 |
| | | | | 55/484 |
| 2012/0227934 | A1* | 9/2012 | Huang | F28D 15/046 |
| | | | | 29/890.032 |
| 2013/0014916 | A1* | 1/2013 | Wadley | F28D 15/046 |
| | | | | 29/890.032 |
| 2014/0138059 | A1* | 5/2014 | Ambrose | B64G 1/503 |
| | | | | 165/104.26 |
| 2017/0122673 | A1* | 5/2017 | Chin | H01L 23/427 |
| 2020/0149823 | A1* | 5/2020 | Kawabata | F28D 15/046 |
| 2020/0248970 | A1* | 8/2020 | Chen | F28D 15/046 |
| 2022/0139581 | A1* | 5/2022 | Dulloo | G21C 15/257 |
| | | | | 376/100 |
| 2022/0282934 | A1* | 9/2022 | Hara | H05K 7/20336 |
| 2022/0406480 | A1 | 12/2022 | McClure | |
| 2024/0011715 | A1* | 1/2024 | Uekubo | F28D 15/046 |
| 2024/0263888 | A1* | 8/2024 | Shoup | F28D 15/0233 |
| 2024/0266078 | A1* | 8/2024 | Shoup | G21C 3/10 |

OTHER PUBLICATIONS

Search Report in corresponding Taiwanese Application No. 113104410 mailed Nov. 19, 2024.

\* cited by examiner

ADVANCED MANUFACTURING HEAT PIPE SEGMENT WITH INTEGRAL PRINTED WICK

BACKGROUND

Heat pipes are sealed passive devices that rely on phase changes of a working fluid to move thermal energy. Generally, the working fluid cycles between a hot primary section and a cold secondary section via a wick section spanning a length of heat pipe containing relatively small and/or high surface area flowpaths. Current reactor designs call for heat pipes spanning a length of several meters. Conventional methods for manufacturing long heat pipes for nuclear reactors involve several steps and/or techniques and thus, are prone to producing small imperfections or defects at portions along the length of the heat pipe. Heat pipe sections containing any defects are scrapped to avoid failure while in service, despite containing defect-free sub-length sections. Therefore, a need exists to develop alternative heat pipe components and manufacturing methods associated therewith to optimize the cost and throughput of heat pipe manufacture, without compromising the reliability and/or efficiency of heat transfer from a nuclear reactor.

SUMMARY

The following summary is provided to facilitate an understanding of some of the innovative features unique to the aspects disclosed herein and is not intended to be a full description. A full appreciation of the various aspects disclosed herein can be gained by taking the entire specification, claims, and abstract as a whole.

In various aspects, a transition piece for joining heat pipe segments in a joining process is disclosed. In some aspects, the transition piece includes a head section comprising a first tubular segment, a body section extending from a first end to a second end, a tail section comprising a second tubular segment, and alignment tabs configured to facilitate a rotational alignment of an end of the body section and an end of a heat pipe segment during the joining process. In some aspects the head section axially extends from a first end of the transition piece to a first axial position and the first tubular segment is configured to interface with an end portion of a first heat pipe segment. In some aspects, the body section includes a wick comprising an outer surface, wherein the wick defines a cavity therein, and an outer wall comprising an inner surface enclosing the outer surface of the wick. In some aspects, the first end of the body is positioned at the first axial position, the second end of the body is positioned at a second axial position, and the inner surface of the outer wall and the outer surface of the wick are arranged to form a gap therebetween. In some aspects, the tail section axially extends from the second end of the body section to a second end of the transition piece, wherein the second tubular segment is configured to interface with an end portion of a second heat pipe segment. In some aspects, each of the alignment tabs includes an end portion axially extending away from the body section. In some aspects, the body section and the alignment tabs are configured as an integral structure.

In various aspects, a method for producing a transition piece of a heat pipe in a heat transfer system of a nuclear reactor is disclosed. In some aspects, the method includes producing a first section of the transition piece, forming a body of the transition piece with a forming process, and forming a tail section of the transition piece. In some aspects, the first section of the transition piece is configured to axially extend from a first end of the transition piece to a first axial position and an inner portion of the first section is configured to interface with an end portion of a first heat pipe segment. In some aspects, the body includes a wick enclosed by an outer wall, wherein an outer surface of the wick and an inner surface of the outer wall are arranged to form a gap therebetween. In some aspects, the body includes forming a first end of the body at the first axial position and extending the first end of the body to a second axial position. In some aspects, the forming of the tail section includes axially extending the tail section away from the second axial position to a second end of the transition piece. In some aspects, the tail section is configured to interface with an end portion of a second heat pipe segment.

In various aspects, a method for joining segments of a heat pipe in a nuclear reactor is disclosed. In some aspects, the method includes joining a first end portion of a transition piece with an end portion of a first heat pipe segment and joining a second end portion of the transition piece with an end portion of a second heat pipe segment to produce the heat pipe. In some aspects, each of the transition piece, the first heat pipe segment and the second heat pipe segment comprises an internal wick section. In some aspects, each of the internal wick sections are coupled to form a continuous wick section of the heat pipe.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of any of the aspects disclosed herein.

BRIEF DESCRIPTION OF THE DRAWINGS

The various aspects described herein, together with objects and advantages thereof, may best be understood by reference to the following description, taken in conjunction with the accompanying drawings as follows.

Figure 1:
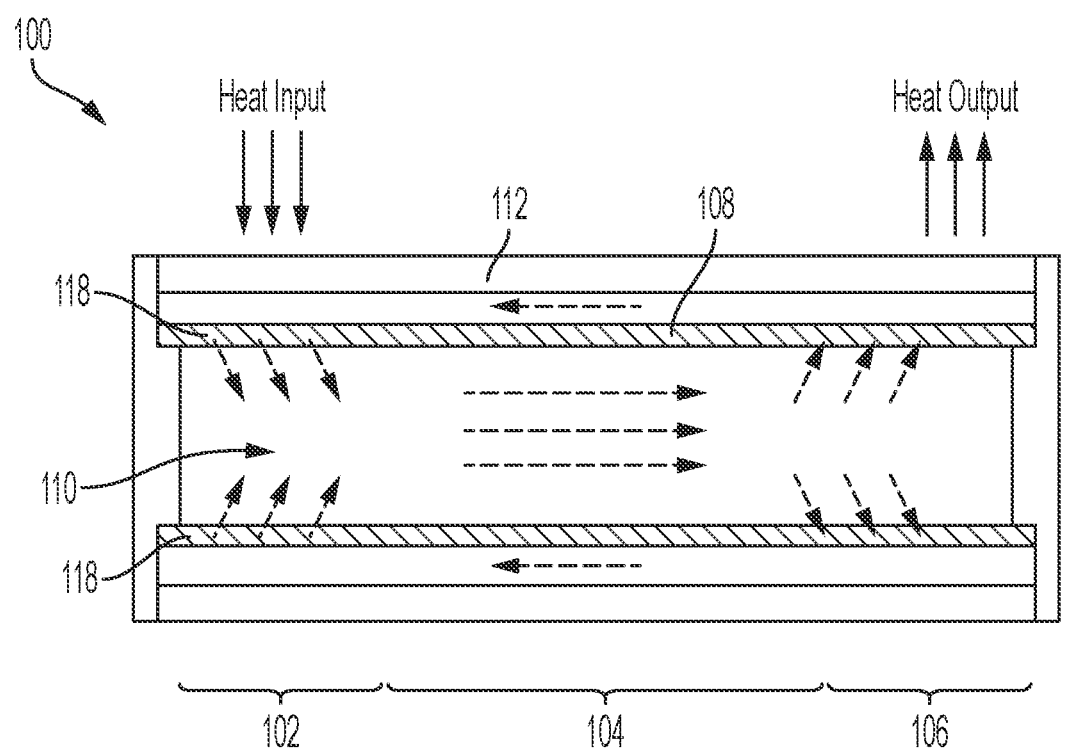
FIG. 1 illustrates a cross-sectional schematic view of a heat pipe, according to at least one non-limiting aspect of the present disclosure.

Corresponding reference characters indicate corresponding parts throughout the several views. The exemplifications set out herein illustrate various aspects of the present disclosure, in one form, and such exemplifications are not to be construed as limiting the scope of any of the aspects disclosed herein.

DETAILED DESCRIPTION

Certain exemplary aspects of the present disclosure will now be described to provide an overall understanding of the principles of the composition, function, manufacture, and use of the compositions and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present disclosure is defined solely by the claims. The features illustrated or described in connection with one exemplary aspect may be combined with the features of other aspects. Such modifications and variations are intended to be included within the scope of the present disclosure.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

In the following description, like reference characters designate like or corresponding parts throughout the several views of the drawings. Also in the following description, it is to be understood that such terms as "forward," "rearward," "left," "right," "above," "below," "upwardly," "downwardly," and the like are words of convenience and are not to be construed as limiting terms.

Those of ordinary skill in the art will understand that references to the terms "radial" and "concentric" appearing in the Specification and the claims are not necessarily limited to and/or related to circular cross-sections or any particular shapes having an arc and may be used with any shape or geometry having a center of rotation. For example, a square circumscribed in a circle are concentric and a line segment extending from the center of a square towards a side or a corner of the square can be described as a line segment extending radial outward.

A heat pipe is a hermetically sealed, two-phase heat transfer component used to transfer heat from a primary side (evaporator section) to a secondary side (condenser section). For example, FIG. 1 illustrates a heat pipe 100 comprising a wick 108, an outer wall 112, an evaporator section 102, an adiabatic section 104 and a condenser section 106. The wick 108 defines a cavity 110 therein and includes a porous region 118 comprised of capillaries, grooves, microchannels, and/or other high-surface area region. The cavity 110 can function as a central flowpath amenable to vapor flow while the high surface area of the porous region 118 defines a peripheral flowpath amenable to liquid flow driven by capillary action and/or gravity assist. The heat pipe 100 further includes a working fluid, such as, for example, water, liquid potassium, sodium, or alkali metal. In operation, the working fluid is configured to absorb heat in the evaporator section 102 and undergo a phase transition into a saturated vapor. The saturated vapor flows towards the condenser section 106 through the adiabatic section 104 via the cavity 110. As the vapor loses its latent heat of vaporization at the condenser section 106, the resulting condensed phase returns back to the evaporator section 102 via a peripheral flow through the wick 108 and the surrounding gap between the wick 108 and the outer wall 112. The aforementioned flow path of the working fluid is illustrated by segmented arrows in FIG. 1. The phase change processes and two-phase flow circulation continues as long as the temperature gradient between the evaporator and condenser sections is maintained. Due to the very high heat transfer coefficients for boiling and condensation, heat pipes are highly effective thermal conductors.

In nuclear systems, heat pipes are utilized by placing the evaporator section of the heat pipe within the reactor core containing nuclear fuel and the condenser section is placed near heat exchangers. The nuclear fuel vaporizes the working fluid and heat exchangers absorb the latent heat at the condenser section. Example heat pipes in nuclear applications are described in U.S. Pat. Nos. 5,684,848, 6,768,781, and U.S. Patent Application Publication No. 2016/0027536, all of which are incorporated by reference in their entirety.

Another example use for heat pipes in nuclear systems is with micro-reactors, which are nuclear reactors that generate less than 10 MWe and are capable of being deployed for remote applications. These micro-reactors can be packaged in relatively small containers, operate without active involvement of personnel, and operate without refueling/replacement for a longer period than conventional nuclear power plants. One such micro-reactor is the eVinci Micro Reactor system, designed by Westinghouse Electric Company. The eVinci system is a heat pipe cooled reactor power system that utilizes heat pipes to act as passive heat removal devices that efficiently move thermal energy out of the reactor core to heat exchangers.

The heat pipes used in the micro-reactors experience extreme operating temperatures (>850° C.) and requires an internal wick that is made from materials that can withstand these temperatures and are compatible with the working fluid. Conventional wicks can be constructed from a wire mesh that is rolled and diffusion bonded together into a tube-like structure. The wick tube allows for the working fluid within the heat pipe to pass through it radially (such as after the latent heat is given off and the working fluid is absorbed by the wick) and along its axis or length (transferring the working fluid back toward the evaporator section with capillary action) while remaining rigid.

Manufacturing a wick for insertion into a heat pipe requires a highly complex and detailed process. At a very high level, a wick is currently manufactured by rolling a sheet of woven wick mesh material into a desired shape, compressing materials (such as tubing) into the wick to forcefully deform the wick into the desired shape, diffusion bonding the mesh together in an oven at vacuum levels while maintaining the wick in a compressed state, and then removing materials used to hold the wick in the compressed state during diffusion bonding. An example of this method for wick forming method are described in U.S. Pat. No. 3,964,902, titled "METHOD OF FORMING A WICK FOR A HEAT PIPE", which is incorporated by reference herein.

As described above, the current method of forming a wick requires that materials used to hold the wick in the compressed state need to be removed after the diffusion bonding process. U.S. Pat. No. 3,964,902, as an example, describes how copper inner and outer mandrels are used to compress the wick and then, after diffusion bonding, the inner and outer mandrel need to be chemically removed through a chemical etching technique. Exposing the wick to this chemical etching process, however, introduces impurities into the wick and diminishes the wick's ability to perform its intended function. The chemical etching technique also results in an increased time and cost associated with producing wicks.

In the context of microreactors, heat pipes must be manufactured with lengths in excess of 7 meters. Conventional methods for producing the required tubing and wicks at these lengths with the appropriate materials are costly and leave minimal room for error. Small imperfections within the tubing or wick could result in premature failure of the heat pipe in service, thereby leading to rejection of these items prior to any further processing since the feasibility of repair or rework with currently available methods is unlikely. Cutting off sections of the otherwise defect-free sub-length segments of heat pipes compromises the hermetic seal thereby rendering the heat pipe segment unusable. Thus, the manufacture of heat pipes has a potential for high scrap rates. Additionally, current methods for manufacturing heat pipes involve complex techniques limited to producing linear sections and which do not allow for any variability in redirection of flow and/or flowpath cross-section geometries. Accordingly, various aspects of the present disclosure provide various devices and methods for optimizing the technical and economic aspects of manufacturing heat pipes including recovery of heat pipe segments. In some implementations, the optimization can reduce the cost of manufacturing pipes and/or minimize the amount of waste products therefrom.

As described below in greater detail, a transition piece generally includes a head section, a body section and a tail section. The head section and the tail section can separately interface with end portions of separate heat pipe segments having similar or different cross-sectional geometries and/or dimensions. The body section includes a wick and an outer wall to maintain continuity of flowpaths between the joined heat pipe segments. Additionally, a transition piece is generally comprised of a single composition, such as, for example, an alloy of iron, chromium and aluminum (Fe-CrAl) similar to an existing heat pipe segment or joinable thereto with a permanent bonding process such as, for example, welding or brazing.

Figure 2:
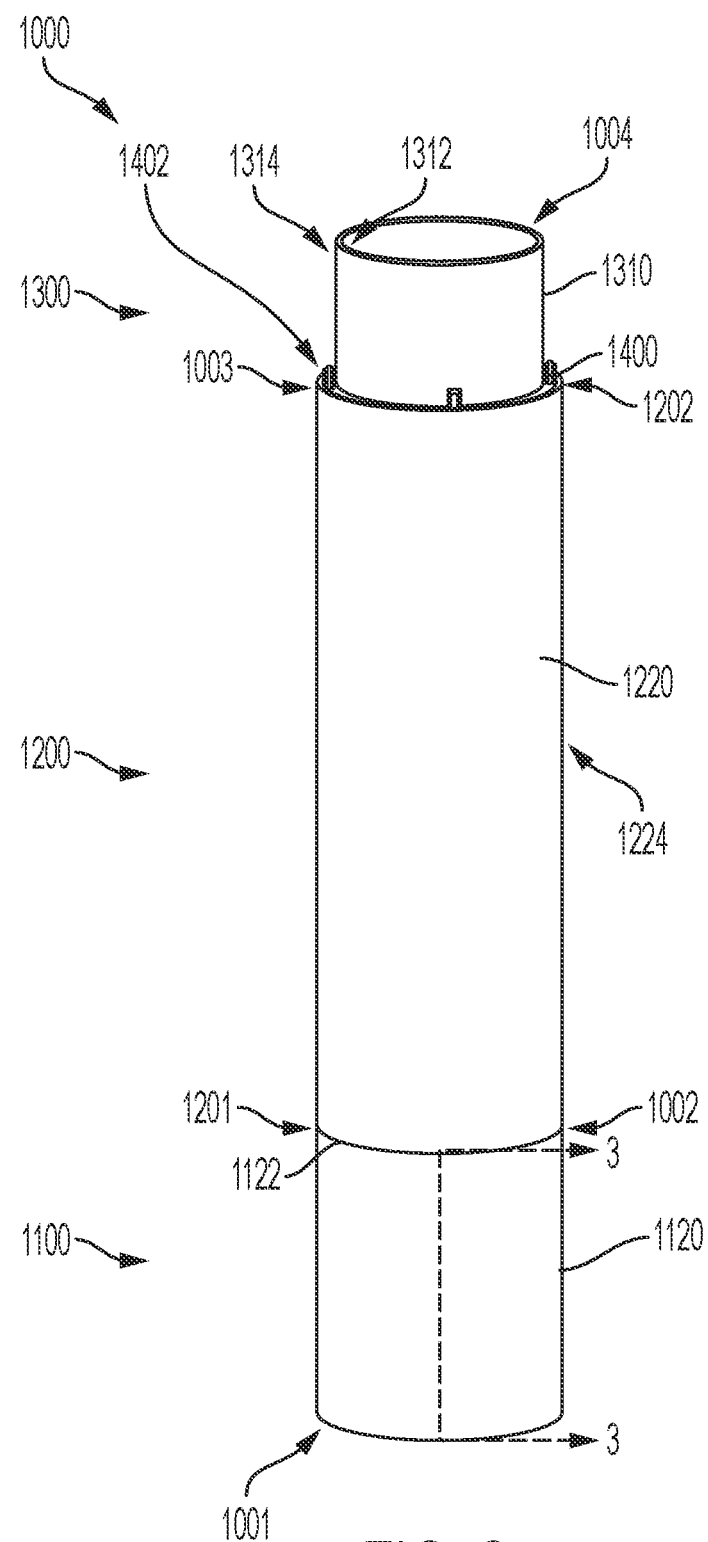
FIG. 2 illustrates a perspective view of a transition piece, according to at least one non-limiting aspect of the present disclosure.

FIG. 2 provides a perspective view of a transition piece 1000, in accordance with at least one non-limiting aspect of the present disclosure. The transition piece 1000 comprises a head section 1100 linearly extending from a first end 1001 to a first axial position 1002, a body section 1200 linearly extending from the first axial position 1002 to a second axial position 1003, a tail section 1300 linearly extending from the second axial position 1003 to a second end 1004, and alignment tabs 1400. As described hereinbelow in the present disclosure, the alignment tabs 1400 are positioned radially outward with respect to the head section 1100 and/or the tail section 1300.

Figure 3:
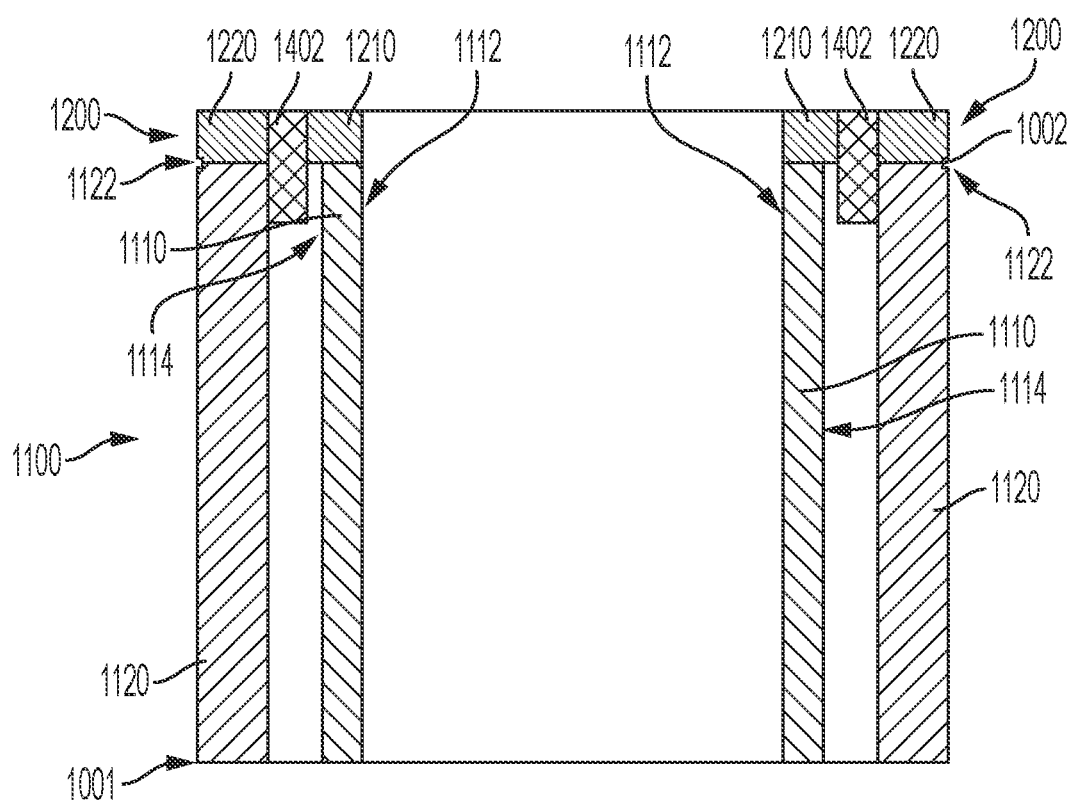
FIG. 3 illustrates a partial cross-sectional schematic view of the transition piece of FIG. 2, according to at least one non-limiting aspect of the present disclosure.

FIG. 3 provides a partial cross-sectional view of the transition piece 1000 of FIG. 2, in accordance with at least one non-limiting aspect of the present disclosure. In various examples, the head section 1100 includes a first tubular segment 1110 having an inner surface 1112 and an outer surface 1114. In some examples, the head section 1100 can include an outer section 1120 surrounding the first tubular segment 1110.

The first tubular segment 1110 is configured to interface with an end portion of a first heat pipe segment. For example, the first tubular segment 1110 can be configured as a cylindrical tube having an axial length corresponding to an insertion depth thereof into an end portion of the first heat pipe segment. In some examples, the first tubular segment 1110 is configured with an axial length of about 12.5 millimeters. The outer surface 1114 can have a diameter substantially the same as, or slightly smaller than, an opening of the first heat pipe segment. Additionally the diameter of the inner surface 1112 can be configured to be slightly smaller than the inner diameter of the first heat pipe segment. For example, the inner surface 1112 can have a diameter of about 4 millimeters less than, about 3 millimeters less than, or about 2 millimeters less than, the diameter of the outer surface 1114. A first tubular segment 1110 incorporating this configuration can be inserted into an end portion of the first heat pipe segment in axial alignment therewith without significantly reducing the original cross-sectional area available for central fluid flow in the first heat pipe segment. Thus, the first tubular segment 1110 can be configured to continue a flow path of a heat pipe segment without compromising the central fluid flow characteristics thereof.

Now referring to FIGS. 2-3, in examples where the head section 1100 includes an outer section 1120, the outer section 1120 can be configured as a removable and/or sacrificial support. For example, the first tubular segment 1110 and the outer section 1120 can be configured as concentric geometries separated by a gap. The outer section 1120 can provide additional support during a manufacture of the transition piece 1000. For example, if the transition piece 1000 is produced with an additive manufacturing process, such as, for example, powder bed fusion, the outer section 1120 can provide additional support in conjunction with the first tubular section segment 1110 when the head section 1100 must act as the base for the remaining portions of the transition piece 1000. Additionally, the outer section 1120 can include an indicator feature 1122 at the first axial position 1002 such as, for example, an indent, a groove, or a perforation, to indicate an axial transition from the head section 1100 to the body section 1200. An outer section 1120 incorporating this configuration can facilitate a complete removal thereof from the transition piece 1000 without affecting the properties and/or geometry of the first tubular segment 1110 and/or the body section 1200.

Now referring back to FIG. 2, the tail section 1300 comprises a second tubular segment 1310 having an inner surface 1312 and an outer surface 1314. In various examples, the second tubular segment 1310 is configured to interface with an end portion of a second heat pipe assembly. For example, the second tubular segment 1310 can be configured as a cylindrical tube having an axial length corresponding to an insertion depth thereof into an end portion of the second heat pipe segment. In some examples, the second tubular segment 1310 is configured with an axial length of about 12.5 millimeters. The outer surface 1314 can have a diameter substantially the same as, or slightly smaller than, an opening of the second heat pipe segment. Additionally the diameter of the inner surface 1312 can be configured to be slightly smaller than the inner diameter of the second heat pipe segment. For example, the inner surface 1312 can have a diameter of about 4 millimeters less than, about 3 millimeters less than, or about 2 millimeters less than the diameter of the outer surface 1314. A second tubular segment 1310 incorporating this configuration can be inserted into an end portion of the second heat pipe segment in axial alignment therewith without significantly reducing the original cross-sectional area available for central fluid flow in the second heat pipe segment. Thus, the second tubular segment 1310 can be configured to continue a flow path of a heat pipe segment without compromising the central fluid flow characteristics thereof.

In some examples, the second tubular segment 1310 can be configured similarly to the first tubular segment 1110. Thus, the transition piece 1000 can be configured to interface with end portions of two similarly sized heat pipe segments. Other configurations of the transition piece 1000 for joining dissimilar heat pipe segments are contemplated by the present disclosure. For example, in some implementations, the first tubular segment 1110 and the second tubular segment 1310 are configured with differing dimensions and/or cross-sectional geometry.

Figure 4:
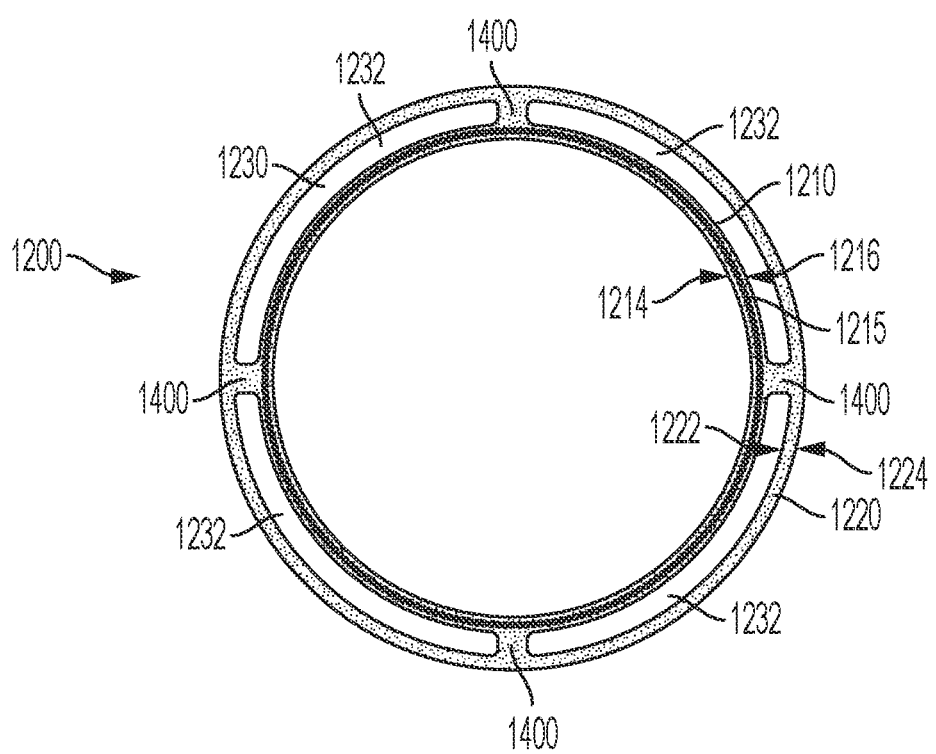
FIG. 4 illustrates a cross-sectional view of a body section of a transition piece, according to at least one non-limiting aspect of the present disclosure.

FIG. 4 is a cross-sectional view of a body section 1200 comprising a wick 1210 and an outer wall 1220, according to at least one non-limiting aspect of the present disclosure. The body section 1200 includes a first end 1201 positioned at the first axial position 1002 and a second end 1202 positioned at the second axial position 1003. The wick 1210 comprises an inner surface 1214 defining a cavity therein, and an outer surface 1216. The outer wall 1220 comprises an inner surface 1222 and an outer surface 1224. The inner surface 1222 of the outer wall encloses the outer surface 1216 of the wick.

The outer wall 1220 can be configured to mate to an existing heat pipe segment. For example, the outer wall 1220 can be configured with a cylindrical geometry with an outer surface 1224 having a diameter substantially the same as, or slightly greater than, the outer diameter of an end of an existing heat pipe segment. In some examples, the end portion of the outer surface 1224 located at the first end 1201 and/or second end 1202 is configured with an outer diameter of about 40 millimeters, or about 30 millimeters, or about 25 millimeters, or about 20 millimeters, or about 15 millimeters, or about 10 millimeters. In certain examples, the outer wall 1220 can be configured with a cylindrical geometry having an outer diameter of about 21 millimeters, or of about 17 millimeters. Additionally, the outer wall 1220 can be configured with a thickness of about 10 millimeters or less, or about 5 millimeters or less, or about 3 millimeters or less, or about 2 millimeters. In certain examples, the outer wall 1220 can be configured with an inner diameter greater than an inner diameter of an outer wall of an existing heat pipe segment to be joined to the transition piece 1000. An outer wall 1220 incorporating this configuration can provide a surface at the first end 1201 and/or the second end 1202 suitable for undergoing a bonding process with an end of a heat pipe segment in contact therewith and/or a final machining process while maintaining structural integrity. Thus, in some aspects, a body section 1200 can be configured to be joined with an end portion of a heat pipe segment while maintaining the original strength and/or footprint of the heat pipe segment. Other configurations of the outer wall 1220 are contemplated by the present disclosure. For example, in some implementations, the outer wall 1220 can be configured with an ovalized cross-section, a rectangular cross-section, a hexagonal cross-section, a conical geometry, or combinations thereof including continuous and/or step changes in size, thickness and/or geometry along the length of the body section 1200.

In various examples, the wick 1210 is configured to continue one or more flowpaths of an existing heat pipe segment. For example, the portion of the wick 1210 located at the first end 1201 and/or the second end 1202 of the body section can be configured with a cross-sectional geometry substantially the same as an end of a wick of heat pipe segment to be joined thereto. In some examples, the wick 1210 is configured as a cylindrical tube having a thickness and outer diameter substantially the same as, respectively, the thickness and outer diameter of a cylindrical wick of a heat pipe segment to be joined with the transition piece 1000. In some aspects, a wick 1210 incorporating this configuration maintains the characteristics of the saturated vapor flow from one heat pipe segment to another heat pipe segment. Other configurations of the wick 1210 are contemplated by the present disclosure. For example, in some implementations, the wick 1210 can be configured to vary in thickness and/or cross-sectional geometry from the first end 1201 to the second end 1202.

Further to the above, the wick 1210 can be configured to continue a peripheral flow between heat pipe segments connected by the transition piece 1000. For example, the wick 1210 can include a porous region 1215 extending from the first end 1201 to the second end 1202 of the body section 1200. In various examples, the porous region 1215 is formed with a similar morphology to a wick of a heat pipe segment to be joined to the transition piece 1000. In some examples, the porous region 1215 can be comprised of a number of capillary flowpaths. In one example, the porous region 1215 can include an array of channels axially aligned with the body section 1200 as depicted in FIG. 4. Other configurations are contemplated by the present disclosure. For example, in some implementations, the porous region 1215 can be comprised of axial grooves, a granular region having open porosity, a region of partially sintered particles, an etched surface, a region having a radial permeability gradient, a region having a lattice-type structure, or any combination thereof.

In various examples, the inner surface 1222 of the outer wall is arranged around the outer surface 1216 of the wick to form a gap 1230 therebetween. In some examples, the wick 1210 and the outer wall 1220 are arranged in a concentric configuration. In certain examples, the cross-sectional geometries of the wick 1210 and the outer wall 1220 are similarly shaped nested geometries. Thus, in examples of a body section 1200 where the wick 1210 and/or the outer wall 1220 are configured to vary in cross-sectional geometry and/or thickness along the length of the body section 1200, the gap 1230 formed therebetween can have a variable thickness. In one example, upon a joining of an existing heat pipe segment and the transition piece 1000, the gap 1230 can be radially aligned with an inner radial portion of an outer wall of the existing heat pipe segment immediately surrounding the wick of the existing heat pipe segment.

Now referring back to FIGS. 2-3, an end portion 1402 of each of the alignment tabs 1400 axially extends in parallel with the head section 1100 and/or the tail section 1300, in a direction oriented away from the first end 1201 and/or the second end 1202 of the body section 1200 and in alignment with the gap 1230. In various examples, a portion of at least some of the alignment tabs 1400 is positioned within the gap 1230. In some examples, each of the alignment tabs 1400 is configured as an elongated member spanning the entire length of the body section 1200, thereby separating the gap 1230 into angular partitions 1232. In the elongated configuration of the alignment tabs 1400, at least one of the alignment tabs can include a first end portion 1402 extending away from the first end 1202 and a second end portion 1402b extending away from the second end 1204. In one example, each of the alignment tabs 1400 is elongated and includes a first end portion 1402a and a second end portion 1402b.

The alignment tabs 1400 are configured to facilitate a radial and/or rotational alignment of an end of the body section 1200 and an end of a heat pipe segment during a joining thereof. For example, an end portion 1402 can be configured to be accepted by a complementary opening positioned at an end of an inner radial portion of an outer wall of the heat pipe segment. In some examples, an end portion 1402 can be configured as a parallel key having a rectangular cross-section geometry sized to fit into an axial keyway machined into an end of an outer wall of a heat pipe segment. In certain examples, each of the end portions 1402 can be configured with a width of about 3 millimeters or less, or about 2 millimeters or less, or about 1 millimeter, and a length of about 2 millimeters or less, or about 1 millimeter. Additionally, each of the end portions 1402 can be configured with a thickness of less than about 2 millimeters, or about 1 millimeter. In one example, each of the alignment tabs 1400 includes two dissimilarly configured end portions.

Additionally, the number of end portions 1402 can be configured to optimize an amount of machining required into a corresponding heat pipe segment. For example, in some implementations, the transition piece 1000 can be limited to four or less end portions 1402 extending from each end of the body section 1200. A transition piece 1000 incorporating this configuration can minimize the number of alignment tabs 1400 required to facilitate a radial and/or rotational alignment with an existing heat pipe segment, thereby minimizing the amount of machining required near to the outer surface of the wick of the existing heat pipe segment. Accordingly, in some aspects, the transition piece 1000 can be configured to minimize any incidental damage to a porous region of a wick of the existing heat pipe segment by minimizing the amount of machining required thereabouts in preparation for a joining process, thereby maintaining the available flow paths for condensed fluid from the existing heat pipe segment through the transition piece 1000.

The alignment tabs 1400 can maintain a positioning of the wick 1210 and the outer wall 1220. For example, in a body section 1200 where the wick 1210 and/or the outer wall 1220 form a variable thickness gap 1230, each alignment tab 1400 can be independently configured to vary in thickness to radially bridge the portions of the variable gap 1230 coinciding with a portion of the alignment tab 1400 positioned in the gap 1230, thereby forming an integral structure. In examples where the alignment tabs 1400 are elongated, the thickness of each of the alignment tabs 1400 can be configured to vary along the length of the body section 1200 to radially bridge the gap 1230 and/or maintain contact between the wick 1210 and the outer wall 1220 along the entire length of the body section 1200. In some aspects, alignment tabs 1400 incorporating this configuration can support a radial, rotational, and axial alignment between the wick 1210 and the outer wall 1220. In some examples, the wick 1210, the outer wall 1220 and the alignment tabs 1240 can be integrally formed from a common feedstock by a single forming process such as, for example, an additive manufacturing process, thereby forming a monolithic structure. In one example, the transition piece 1000 is formed as a monolithic structure.

Figure 5:
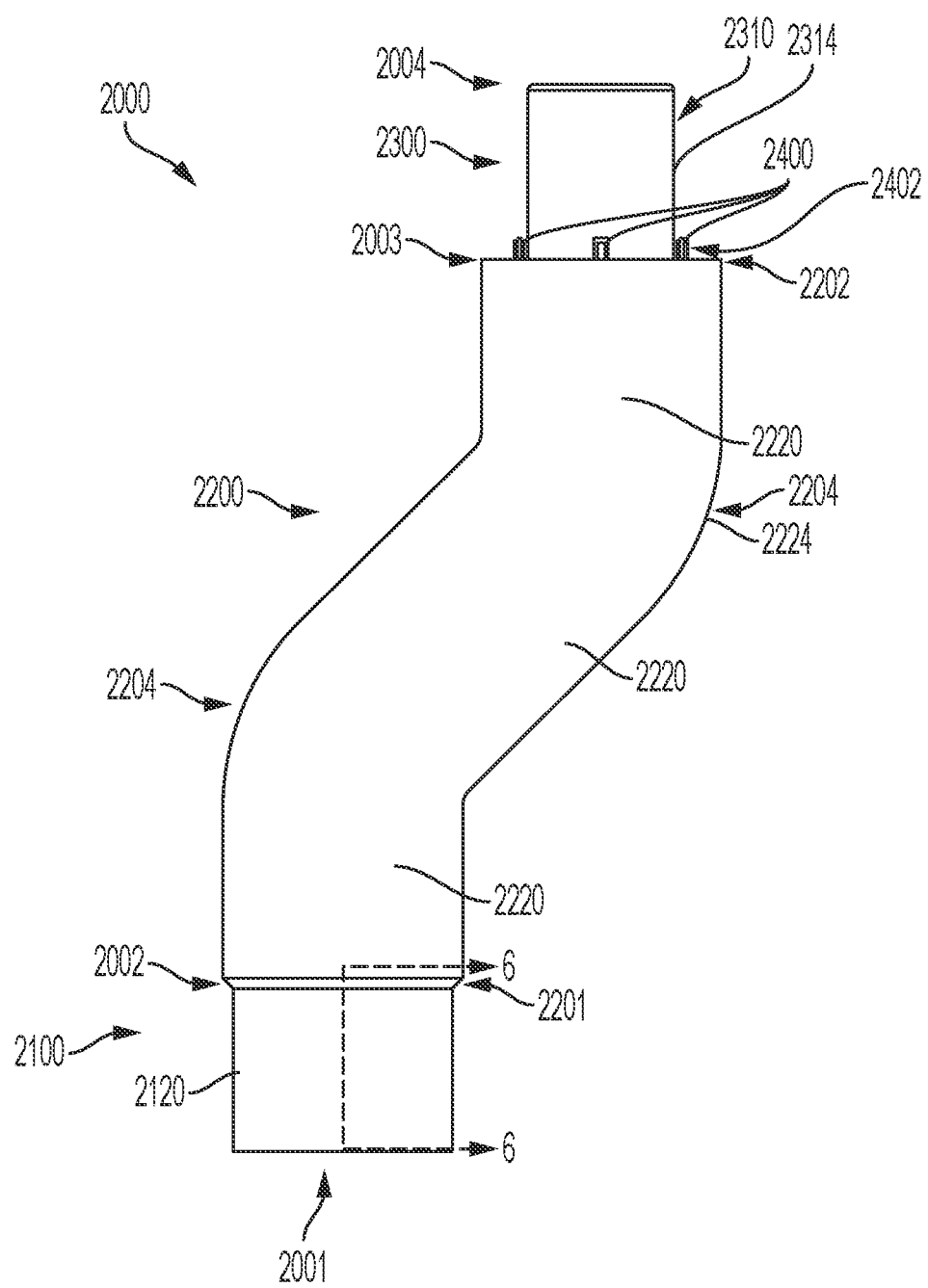
FIG. 5 illustrates a perspective view of a transition piece, according to at least one non-limiting aspect of the present disclosure.

Now referring to FIG. 5, a perspective view of a transition piece 2000 is provided, in accordance with at least one non-limiting aspect of the present disclosure. The transition piece 2000 comprises a head section 2100 linearly extending from a first end 2001 to a first axial position 2002, a body section 2200 extending from a first end 2201 positioned at the first axial position 2002 to a second end 2202 positioned at the second axial position 2003, a tail section 2300 linearly extending from the second axial position 2003 to a second end 2004, and three or more alignment tabs 2400.

Figure 6:
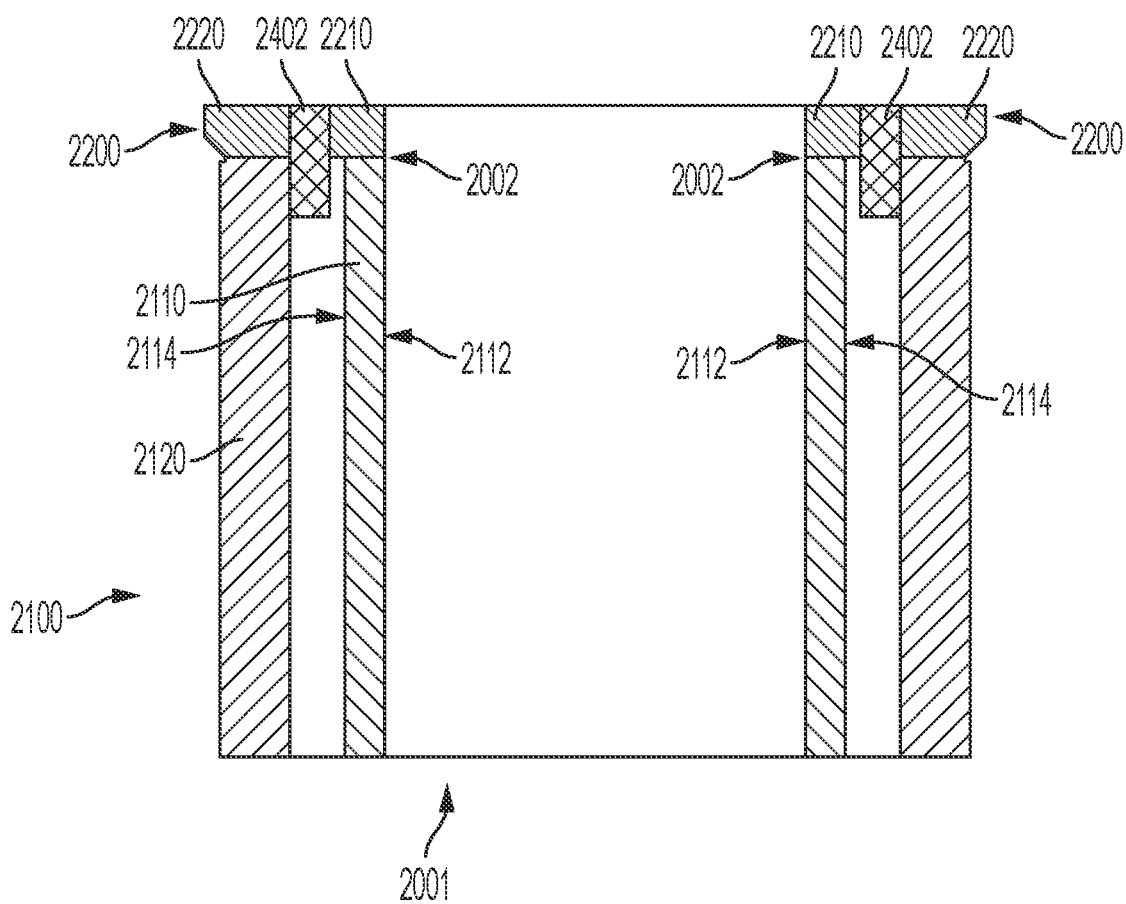
FIG. 6 illustrates a partial cross-sectional schematic view of the transition piece of FIG. 5, according to at least one non-limiting aspect of the present disclosure.

FIG. 6 illustrates a partial cross-sectional schematic view of the transition piece 2000 of FIG. 5, according to at least one non-limiting aspect of the present disclosure. In various examples, the head section 2100 includes a first tubular segment 2110 and an outer section 2120 surrounding the first tubular segment. The first tubular segment 2110 comprises an inner surface 2112 and an outer surface 2114. The head section 2100 can be configured similarly to a head section 1100 as described hereinabove. Thus, the first tubular segment 2110 can be configured to interface with an end portion of a first heat pipe segment and continue a central flow path thereof. Additionally, the outer section 2120 can be configured to facilitate a complete removal thereof from the transition piece 2000 without affecting the properties and/or geometry of the first tubular segment 2110 and/or the body section 2200.

Now referring back to FIG. 5, the tail section 2300 comprises a second tubular segment 2310 having an inner surface and an outer surface 2314. The tail section 2300 can be configured similarly to a tail section 2100 as described hereinabove. Thus, the tail section 2300 can be configured to interface with an end portion of a second heat pipe segment and continue a central flow path thereof.

In some examples, the second tubular segment 2310 can be configured similarly to the first tubular segment 2110. Thus, the transition piece 2000 can be configured to bridge two similarly sized heat pipe segments. Alternatively, the dimensions and/or cross-sectional geometry of a first tubular segment 2110 and a second tubular segment 2310 can be independently configured. Thus, in some aspects, a transition piece 2000 incorporating this configuration can provide an interface between heat pipe segments having different cross-sectional geometries and/or dimensions.

Figure 7:
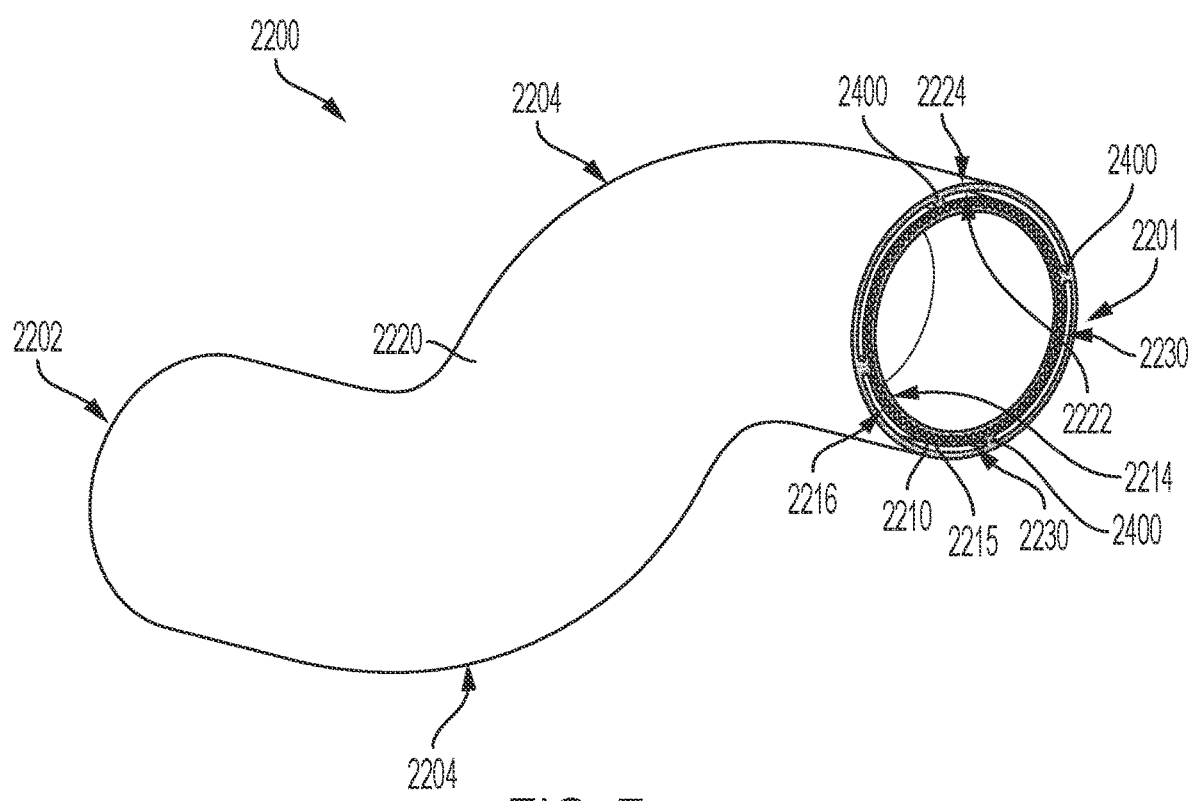
FIG. 7 illustrates a perspective view of a body section of a transition piece, according to at least one non-limiting aspect of the present disclosure.

FIG. 7 illustrates a body section 2200 comprising a wick 2210 and an outer wall 2220, according to at least one non-limiting aspect of the present disclosure. A first end 2201 of the body section 2200 is positioned at the first axial position 2002 and a second end 2202 is positioned at the second axial position 2003. In various examples, the wick 2210 comprises an inner surface 2214 defining a cavity therein, a porous region 2215, and an outer surface 2216. The outer wall 2220 comprises an inner surface 2222 and an outer surface 2224. The inner surface 2222 of the outer wall is arranged around the outer surface 2216 of the wick to form a gap 2230 therebetween. Additionally, each of the alignment tabs 2400 can be elongated to extend through the length of the gap 2230 and includes a first and second end portions 2402.

In some aspects, the wick 2210 and the outer wall 2220 can be configured similarly to, respectively, other wicks and outer walls described elsewhere in the present disclosure. For example, the cross-section geometry, thickness, and relative positioning of the wick 2210 and the outer wall 2220 can be configured to mate with an end of the body section

2200 to an existing heat pipe segment and without compromising the central fluid flow characteristics thereof. The porous region 2215 of the wick 2210 can be configured to continue a peripheral flow between multiple wicks connected by the transition piece 2000.

The alignment tabs 2400 can be configured similarly to other alignment tabs described elsewhere in the present disclosure. Thus, each of the alignment tabs 2400 can be configured to maintain a positioning of the wick 2210 and the outer wall 2220 and each of the first and second end portions 2402 can be configured to facilitate a rotational alignment of an end of the body section 2200 and an end of a heat pipe segment during a joining thereof.

Additionally, the wick 2210, the outer wall 2220 and the alignment tabs 2240 are formed as an integral structure by a single forming process such as, for example, an additive manufacturing process, thereby forming a monolithic structure. In one example, the transition piece 2000 is formed as a monolithic structure. Other configurations are contemplated by the present disclosure. For example, in some implementations, the cross-section geometry and/or thickness of the wick 2210 and the outer wall 2220 can vary along the length of the body section 2200 to connect dissimilarly configured heat pipe segments.

The length of the body section 2200 is configured with a directional change. For example, the length of the wick 2210 and the outer wall 2220 can include an angle, a bend, or an s-bend, or combinations thereof. In various examples, the body section 2200 includes two 45 degree bend sections 2204 in a coplanar arrangement. The rotational relationship between the directional changes can be configured to change an offset between the first end 2201 and the second end 2202. For example, as depicted in FIG. 7, the bend sections 2204 can be arranged in a supplementary configuration forming a 180 degree angle to laterally misalign the first end 2201 and the second end 2202 but effectively maintain an overall direction of the flow therein. Alternatively, a complementary arrangement between two bend sections 2204 would provide a 90 degree angle therebetween, thereby introducing an angular misalignment between the ends 2201 and 2202 and changing the direction of flow therein. Since the first tubular segment 2110 and the second tubular segment 2310 extending linearly from the ends of the body section 2200, an offset between the tubular segments 2110 and 2310 will be dictated by the configuration of the body section 2200. In some examples, the first tubular segment 2110 and the second tubular segment 2310 are oriented with an angular offset, a lateral offset, or a combination thereof. Accordingly, a transition piece 2000 can be configured to reconcile flows between two misaligned heat pipe segments.

Figure 8:
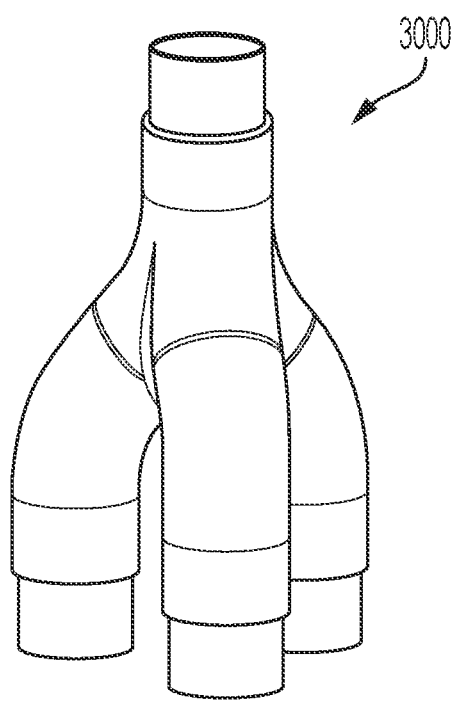
FIG. 8 illustrates a perspective view of a transition piece, according to at least one non-limiting aspect of the present disclosure.

Further to the above, the directional changes can be implemented while maintaining any internal dimensional and/or cross-sectional geometric features of the body section 2200. Since the wick 2210, the outer wall 2220 and the alignment tabs 2400 are integrally formed as a monolithic structure by a single forming process such as additive manufacturing, for example, implementing a bend in the design thereof does not suffer from dimensional change issues associated with conventional manufacturing processes which must overcome tensile and/or compressive stresses of a starting material to achieve a final shape and/or geometry. For example, subjecting a conventionally manufactured straight heat pipe section to a bending process can result in significant delamination, section collapse, and/or fracture within the heat pipe. In examples where the body section 2200 is formed with an additive manufacturing method, the body section 2200 can include a bend having a bend radius substantially the same as, or slightly larger than, the outer diameter of the body section 2200. Accordingly, the body section 2200 can maintain specific design features such as the morphology of porous region 2215 through a directional change. Other directional change configurations are contemplated by the present disclosure. For example, in some implementations, a transition piece 3000 can be configured with multiple laterally offset tail sections as depicted in FIG. 8, for example, wherein each of the tail sections require a dedicated directional change.

A method for producing a transition piece of a heat pipe in a heat transfer system of a nuclear reactor is provided herein, in accordance with at least one non-limiting aspect of the present disclosure. In various examples, the method includes producing a first section of the transition piece, forming a body of the transition piece with a forming process, and forming a tail section of the transition piece. The body includes a wick enclosed by an outer wall, and an outer surface of the wick and an inner surface of the outer wall are arranged to form a gap therebetween. In some examples, the wick and the outer wall are arranged concentrically. In certain examples, the first section, the body, and the tail section are formed from a common feedstock and with a single forming process.

In various examples, the first section is configured to axially extend from a first end of the transition piece to a first axial position and an inner portion of the first section is configured to interface with an end portion of a first heat pipe segment. In some examples, the first section of the transition piece comprises an outer portion surrounding the inner portion, and the outer portion is a sacrificial portion configured to be separated from the transition piece at the first axial position. In certain examples, the method includes a step of removing the sacrificial portion.

In various examples, the forming of the tail section includes axially extending the tail section away from the second axial position to a second end of the transition piece. The tail section is configured to interface with an end portion of a second heat pipe segment.

In various examples, the forming of the body comprises forming a first end of the body at the first axial position and extending the first end of the body to a second axial position. The method can be configured to form the wick and the outer body simultaneously. For example, the wick and the outer wall can be formed from a common feedstock and/or with an additive manufacturing process, such as, for example, powder bed fusion. In some aspects, a method incorporating this configuration can introduce directional changes between the first end and the second end of the body while maintaining a desired cross-section geometry and internal features therein.

In some examples, the forming of the body includes forming a porous region of the wick. In certain examples, the method includes integrally forming an alignment tab with the body, wherein a first portion of the alignment tab maintains an arrangement of the wick and the outer wall. In one example, the alignment tab includes an end portion axially extending away from the body past at least one of the first axial position or the second axial position, or a combination thereof. A method for producing a transition piece incorporating additive manufacturing can correctly configure a radial and rotational positioning of the end portions of the alignment tabs to radial and rotationally align the transition piece with at least one of a first heat pipe segment or a second heat pipe segment, or a combination thereof.

A transition piece produced by the method for producing a transition piece described hereinabove can be incorporated into a method for producing a heat pipe. For example, as described herein, a joining method for joining segments of a heat pipe in a nuclear reactor is disclosed, in accordance with at least one non-limiting aspect of the present disclosure. In various examples, the joining method can include joining a first end portion of a transition piece with an end portion of a first heat pipe segment and joining a second end portion of the transition piece with an end portion of a second heat pipe segment to produce the heat pipe. Each of the first heat pipe segment and the second heat pipe segment includes an internal wick section. The joining method is configured to couple each of the internal wick sections to form a continuous wick section of the heat pipe. For example, the joining method can include axially inserting an end portion of the transition piece into an end portion of the first and/or second heat pipe segments to rotationally align a wick portion of the transition piece with the internal wick portion of the first and/or second heat pipe segment. In some examples, the joining method can include preparing an end portion of the first and/or second heat pipe segments to accept an end portion of an alignment tab of the transition piece, prior to a joining thereof. In certain examples, the joining method can include bonding, welding, and/or brazing an end portion of the first and/or second heat pipe segment to the transition piece. A joining method incorporating this configuration can properly orient a first and/or second heat pipe segment in alignment with a transition piece to provide an uninterrupted flowpath between the first and second heat pipe segments. Accordingly, the joining method for joining heat pipe segments can join otherwise unusable heat pipe segments to lower the scrap rate thereof, thereby reducing manufacturing costs. Other configurations of the joining method as described herein are contemplated by the present disclosure. For example, in some implementations, the joining method for joining heat pipe segments can include separately joining three or more heat pipe segments to a transition piece.

Various aspects of the present disclosure include, but are not limited to, the aspects listed in the following numbered clauses.

Clause 1—A transition piece for joining heat pipe segments in a joining process, the transition piece comprising a head section comprising a first tubular segment, a body section extending from a first end to a second end, a tail section comprising a second tubular segment, and alignment tabs configured to facilitate a rotational alignment of an end of the body section and an end of a heat pipe segment during the joining process. The head section axially extends from a first end of the transition piece to a first axial position and the first tubular segment is configured to interface with an end portion of a first heat pipe segment. The body section further comprises a wick comprising an outer surface, wherein the wick defines a cavity therein; and an outer wall comprising an inner surface enclosing the outer surface of the wick. The first end of the body section is positioned at the first axial position and the second end is positioned at a second axial position, and the inner surface of the outer wall and the outer surface of the wick are arranged to form a gap therebetween. The tail section axially extends from the second end of the body section to a second end of the transition piece, wherein the second tubular segment is configured to interface with an end portion of a second heat pipe segment. Each of the alignment tabs comprises an end portion axially extending away from the body section, and wherein the body section and the alignment tabs are configured as an integral structure.

Clause 2—The transition piece of clause 1, wherein the first tubular segment and the second tubular segment are independently configured with cylindrical geometries.

Clause 3—The transition piece of clause 2, wherein the first tubular segment and the second tubular segment are configured with different outer diameters.

Clause 4—The transition piece of any of clauses 1-3, wherein a cross sectional geometry of the wick varies substantially continuously between the first end of the body section and the second end of the body section.

Clause 5—The transition piece of any of clauses 1-4, wherein the first tubular segment and the second tubular segment are oriented with at least one of an angular offset or a lateral offset, or combinations thereof.

Clause 6—The transition piece of any of clauses 1-5, wherein the body section is formed with a directional change.

Clause 7—The transition piece of any of clauses 1-6, wherein the wick is comprised of a porous region.

Clause 8—The transition piece of any of clauses 1-7, wherein at least some of the alignment tabs comprises a portion extending into the gap formed between the inner surface of the outer wall and the outer surface of the wick.

Clause 9—The transition piece of clause 8, wherein the portions of the alignment tabs extending into the gap are integrally formed with the wick and the outer wall.

Clause 10—The transition piece of any of clauses 1-9, wherein the head section comprises a support portion surrounding the first tubular segment, wherein the support portion axially extends from the first end of the transition piece to the first axial position, and wherein the support portion is configured to be removed prior to the joining process.

Clause 11—The transition piece of any of clauses 1-10, wherein the transition piece is configured as a monolithic structure.

Clause 12—A method for producing a transition piece of a heat pipe in a heat transfer system of a nuclear reactor, the method comprising producing a first section of the transition piece, forming a body of the transition piece with a forming process, and forming a tail section of the transition piece. The first section is configured to axially extend from a first end of the transition piece to a first axial position, wherein an inner portion of the first section is configured to interface with an end portion of a first heat pipe segment. The body comprises a wick enclosed by an outer wall, wherein an outer surface of the wick and an inner surface of the outer wall are arranged to form a gap therebetween. The forming of the body comprises forming a first end of the body at the first axial position and extending the first end of the body to a second axial position. The forming of the tail section comprises axially extending the tail section away from the second axial position to a second end of the transition piece, wherein the tail section is configured to interface with an end portion of a second heat pipe segment.

Clause 13—The method of clause 12, wherein the first section of the transition piece comprises an outer portion surrounding the inner portion, and wherein the outer portion is a sacrificial portion configured to be separated from the transition piece at the first axial position.

Clause 14—The method of any of clauses 12-13, wherein the body of the transition piece is formed with an additive manufacturing process.

Clause 15—The method of any of clauses 12-14, wherein the wick and the outer wall are formed from a common feedstock.

Clause 16—The method of any of clauses 12-15, wherein the wick and the outer wall are concentrically arranged.

Clause 17—The method of any of clauses 12-16, wherein the forming process is configured to extend the body from the first axial position to the second axial position with at least one directional change.

Clause 18—The method of any of clauses 12-17, wherein the method comprises integrally forming an alignment tab with the body, wherein a first portion of the alignment tab maintains an arrangement of the wick and the outer wall, wherein the alignment tab axially extends away from the body past at least one of the first axial position or the second axial position, or a combination thereof, and wherein the alignment tab is configured to rotationally align the transition piece with at least one of the first heat pipe segment or the second heat pipe segment, or a combination thereof.

Clause 19—A method of joining segments of a heat pipe in a nuclear reactor, the method comprising joining a first end portion of a transition piece with an end portion of a first heat pipe segment and joining a second end portion of the transition piece with an end portion of a second heat pipe segment to produce the heat pipe. Each of the transition piece, the first heat pipe segment and the second heat pipe segment comprises an internal wick section. Each of the internal wick sections are coupled to form a continuous wick section of the heat pipe.

Clause 20—The method of clause 19, wherein the method comprises separately joining three or more heat pipe segments to the transition piece.

Various features and characteristics are described in this specification to provide an understanding of the composition, structure, production, function, and/or operation of the disclosure, which includes the disclosed methods and systems. It is understood that the various features and characteristics of the disclosure described in this specification can be combined in any suitable manner, regardless of whether such features and characteristics are expressly described in combination in this specification. The Inventors and the Applicant expressly intend such combinations of features and characteristics to be included within the scope of the disclosure described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a method or system that "comprises," "has," "includes," or "contains" a feature or features and/or characteristics possesses the feature or those features and/or characteristics but is not limited to possessing only the feature or those features and/or characteristics. Likewise, an element of a composition, coating, or process that "comprises," "has," "includes," or "contains" the feature or features and/or characteristics possesses the feature or those features and/or characteristics but is not limited to possessing only the feature or those features and/or characteristics and may possess additional features and/or characteristics.

The grammatical articles "a," "an," and "the," as used in this specification, including the claims, are intended to include "at least one" or "one or more" unless otherwise indicated. Thus, the articles are used in this specification to refer to one or more than one (i.e., to "at least one") of the grammatical objects of the article. By way of example, "a component" means one or more components and, thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all subranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

As used in this specification, particularly in connection with layers, the terms "on," "onto," "over," and variants thereof (e.g., "applied over," "formed over," "deposited over," "provided over," "located over," and the like) mean applied, formed, deposited, provided, or otherwise located over a surface of a substrate but not necessarily in contact with the surface of the substrate. For example, a layer "applied over" a substrate does not preclude the presence of another layer or other layers of the same or different composition located between the applied layer and the substrate. Likewise, a second layer "applied over" a first layer does not preclude the presence of another layer or other layers of the same or different composition located between the applied second layer and the applied first layer.

Whereas particular examples of this disclosure have been described above for purposes of illustration, it will be evident to those skilled in the art that numerous variations of the details of the present disclosure may be made without departing from the disclosure as defined in the appended claims.

What is claimed is:

1. A transition piece for joining heat pipe segments in a joining process, the transition piece comprising:
    a head section comprising a first tubular segment, wherein the head section axially extends from a first end of the transition piece to a first axial position, wherein the first tubular segment is configured to interface with an end portion of a first heat pipe segment;
    a body section extending from a first end to a second end, the body section comprising:
        a wick comprising an outer surface, wherein the wick defines a cavity therein; and
        an outer wall comprising an inner surface enclosing the outer surface of the wick; and
        wherein the first end is positioned at the first axial position and the second end is positioned at a second axial position, and the inner surface of the outer wall and the outer surface of the wick are arranged to form a gap therebetween;
    a tail section comprising a second tubular segment, wherein the tail section axially extends from the second end of the body section to a second end of the transition piece, wherein the second tubular segment is configured to interface with an end portion of a second heat pipe segment; and
    alignment tabs configured to facilitate a rotational alignment of an end of the body section and an end of a heat pipe segment during the joining process, wherein each of the alignment tabs comprises an end portion axially extending away from the body section, and wherein the body section and the alignment tabs are configured as an integral structure.

2. The transition piece as claimed in claim 1, wherein the first tubular segment and the second tubular segment are independently configured with cylindrical geometries.

3. The transition piece as claimed in claim 2, wherein the first tubular segment and the second tubular segment are configured with different outer diameters.

4. The transition piece as claimed in claim 1, wherein a cross sectional geometry of the wick varies substantially continuously between the first end of the body section and the second end of the body section.

5. The transition piece as claimed in claim 1, wherein the first tubular segment and the second tubular segment are oriented with at least one of an angular offset or a lateral offset, or combinations thereof.

6. The transition piece as claimed in claim 1, wherein the body section is formed with a directional change.

7. The transition piece as claimed in claim 1, wherein the wick is comprised of a porous region.

8. The transition piece as claimed in claim 1, wherein at least some of the alignment tabs comprises a portion extending into the gap formed between the inner surface of the outer wall and the outer surface of the wick.

9. The transition piece as claimed in claim 8, wherein the portions of the alignment tabs extending into the gap are integrally formed with the wick and the outer wall.

10. The transition piece as claimed in claim 1, wherein the head section comprises a support portion surrounding the first tubular segment, wherein the support portion axially extends from the first end of the transition piece to the first axial position, and wherein the support portion is configured to be removed prior to the joining process.

11. The transition piece as claimed in claim 1, wherein the transition piece is configured as a monolithic structure.

12. A method for producing a transition piece of a heat pipe in a heat transfer system of a nuclear reactor, the method comprising:
    producing a first section of the transition piece, wherein the first section is configured to axially extend from a first end of the transition piece to a first axial position, wherein an inner portion of the first section is configured to interface with an end portion of a first heat pipe segment;
    forming a body of the transition piece with a forming process, the body comprising a wick enclosed by an outer wall, wherein an outer surface of the wick and an inner surface of the outer wall are arranged to form a gap therebetween, wherein the forming of the body comprises:
        forming a first end of the body at the first axial position; and
        extending the first end of the body to a second axial position; and
    forming a tail section of the transition piece, the forming of the tail section comprising axially extending the tail section away from the second axial position to a second end of the transition piece, wherein the tail section is configured to interface with an end portion of a second heat pipe segment.

13. The method as claimed in claim 12, wherein the first section of the transition piece comprises an outer portion surrounding the inner portion, and wherein the outer portion is a sacrificial portion configured to be separated from the transition piece at the first axial position.

14. The method as claimed in claim 12, wherein the body of the transition piece is formed with an additive manufacturing process.

15. The method as claimed in claim 12, wherein the wick and the outer wall are formed from a common feedstock.

16. The method as claimed in claim 12, wherein the wick and the outer wall are concentrically arranged.

17. The method as claimed in claim 12, wherein the forming process is configured to extend the body from the first axial position to the second axial position with at least one directional change.

18. The method as claimed in claim 12, wherein the method comprises integrally forming an alignment tab with the body, wherein a first portion of the alignment tab maintains an arrangement of the wick and the outer wall, wherein the alignment tab axially extends away from the body past at least one of the first axial position or the second axial position, or a combination thereof, and wherein the alignment tab is configured to rotationally align the transition piece with at least one of the first heat pipe segment or the second heat pipe segment, or a combination thereof.

19. A method for joining segments of a heat pipe in a nuclear reactor, the method comprising:
   joining a first end portion of a transition piece with an end portion of a first heat pipe segment; and
   joining a second end portion of the transition piece with an end portion of a second heat pipe segment to produce the heat pipe; and
   wherein each of the transition piece, the first heat pipe segment and the second heat pipe segment comprises an internal wick section, and wherein each of the internal wick sections are coupled to form a continuous wick section of the heat pipe.

20. The method as claimed in claim 19, wherein the method comprises separately joining three or more heat pipe segments to the transition piece.

* * * * *